United States Patent [19]
Krude

[11] Patent Number: 5,288,273
[45] Date of Patent: * Feb. 22, 1994

[54] CONSTANT VELOCITY UNIVERSAL JOINT WITH REDUCED CAGE SUPPORTING FACES

[75] Inventor: Werner Krude, Neunkirchen, Fed. Rep. of Germany

[73] Assignee: GKN Automotive AG, Siegburg, Fed. Rep. of Germany

[ * ] Notice: The portion of the term of this patent subsequent to Nov. 26, 2008 has been disclaimed.

[21] Appl. No.: 812,422

[22] Filed: Dec. 23, 1991

[30] Foreign Application Priority Data

Dec. 31, 1990 [DE] Fed. Rep. of Germany ....... 4042277

[51] Int. Cl.$^5$ ................................................. F16D 3/24
[52] U.S. Cl. ..................................... 464/145; 464/906
[58] Field of Search ........................ 464/145, 146, 906

[56] References Cited

U.S. PATENT DOCUMENTS

| | | | |
|---|---|---|---|
| 4,116,020 | 9/1978 | Aucktor et al. | 464/906 X |
| 4,156,353 | 5/1979 | Welschof | 464/145 |
| 4,275,571 | 6/1981 | Welschof | 464/145 |
| 4,494,941 | 1/1985 | Hirai et al. | 464/906 X |
| 4,820,240 | 4/1989 | Girguis | 464/145 |
| 4,950,206 | 8/1990 | Jacob | 464/145 X |
| 4,968,287 | 11/1990 | Jacob | 464/145 |
| 5,067,929 | 11/1991 | Krude | 464/145 |

FOREIGN PATENT DOCUMENTS

| | | |
|---|---|---|
| 1812911 | 6/1960 | Fed. Rep. of Germany . |
| 2433349 | 7/1975 | Fed. Rep. of Germany . |
| 2522670 | 5/1976 | Fed. Rep. of Germany . |
| 2636085 | 1/1978 | Fed. Rep. of Germany . |
| 3132364 | 2/1983 | Fed. Rep. of Germany . |
| 3134272 | 3/1983 | Fed. Rep. of Germany . |
| 3209596 | 10/1985 | Fed. Rep. of Germany . |
| 3730226 | 3/1989 | Fed. Rep. of Germany . |

Primary Examiner—Daniel P. Stodola
Assistant Examiner—Eileen Dunn
Attorney, Agent, or Firm—Harness, Dickey & Pierce

[57] ABSTRACT

A constant velocity universal joint is used as a fixed joint having an outer joint part (2) provided with first meridional ball tracks (6), and a ball hub (4) provided with second meridional ball tracks (7), the center lines of the ball tracks (6, 7) being undercut-free in the same axial projection. A joint base (1) is connected to the outer joint part (2) and is positioned at the open end of the undercut-free ball tracks (6, 7). The joint interior is provided with semi-spherical contact faces (16) between an axially inner partial region of the outer surface (11) of the cage (3) and guiding faces (9) in the joint base (1) while the joint exterior is provided with semi-spherical contact faces (17) between an axially outer partial region of the inner face (12) of the cage (3) and guiding faces (10) of the ball hub (4). The remaining partial regions (18, 19) of the outer joint part (2) and ball hub (4) respectively positioned beyond the contact regions (9, 10, 16, 17) are not in contact with the cage (3) due to free space recesses (13, 14).

15 Claims, 4 Drawing Sheets

CONSTANT VELOCITY UNIVERSAL JOINT WITH REDUCED CAGE SUPPORTING FACES

BACKGROUND OF THE INVENTION

The invention relates to a constant velocity universal joint designed as a fixed joint having an outer joint part provided with first meridional ball tracks, a ball hub provided with second meridional ball tracks, the center lines of the ball tracks each being undercut-free in the same axial projection. Balls are received in the associated first ball tracks and second ball tracks, a ball cage holding the balls in a common plane. A joint base is connected to the outer joint part and is positioned at the open end of the undercut-free ball tracks.

DE 31 32 364 Cl is an example of a constant velocity universal joint. In one axial direction, it comprises undercut-free ball tracks. The outer joint part is integrally connected to a wheel hub and has axially undercut calotte-shaped guiding faces for the cage. Such guiding faces require chip-forming machining or very complicated forming tools to permit non-chip-forming production. The joint base, in a broader sense, forms part of the wheel hub into which a plate metal cover is inserted.

Another constant velocity universal joint is known from DE 32 09 596 C2. It is provided with axially undercut-free ball tracks which open towards the joint base. The outer joint part has a supporting disc with an annular guiding face for a supporting element which fulfills the cage function only in one direction via pressure forces. To prevent the joint from being pulled apart there is provided a calotte-shaped guiding face directly between the cage and the outer joint part. In order to achieve a satisfactory articulation angle, the centers of curvature of the ball tracks have to be offset relative to each other by a relatively large amount. This results in the need for a thick supporting disc, which is disadvantageous. The tracks are subject to high forces, which results in a great deal of wear in the tracks and at the guiding faces of the supporting disc.

It is an object of the present invention to provide a constant velocity universal joint as initially mentioned in which the faces to be machined are reduced to a minimum. It is a further object of the invention to provide a constant velocity universal joint which can be machined very easily because of its shape, as a result of which production expenditure is reduced.

The present invention achieves these objectives in that the joint base is provided with internally positioned undercut-free guiding faces forming a contact region relative to a partial region of the outer face of the cage extending towards the joint base. The remaining partial regions of the inner face of the outer joint part positioned beyond or outside the contact regions are not in contact due to free space recesses set back relative to the outer face of the cage.

In a further embodiment, the ball hub is provided with externally positioned undercut-free guiding faces which form a contact region relative to a partial region of the inner face of the cage extending towards the joint aperture, the remaining partial regions of the outer face of the ball hub positioned outside the contact regions are provided with free space recesses set back relative to the inner face of the cage. The surface of the ball hub which forms these free space recesses, follows the root of the ball track and is dimensioned in such a way that the depths of the ball tracks in the ball hub are substantially constant.

By introducing these measures it is possible to provide a constant velocity universal joint in which only substantially reduced guiding faces at the outer joint part and, in some embodiments, equally reduced guiding faces at the ball hub need to be machined. Non-contacting partial regions of the ball hub do not require precision machining. The undercut-free guiding faces may be produced by simple processes in lieu of chip-forming processes. In one embodiment, the outer joint part and the joint base may be produced by simple tools by cold extrusion or similar non-chip-forming production methods.

In the region adjoining the guiding faces, a circumferential recess is provided at the outer joint part and at the ball hub relative to the cage, as a result of which the lubrication conditions at the cage may be improved. In consequence, the requirements for production accuracy may be less stringent.

With usual designs, the preferred assembly method consists of the inner joint part, with the axes extending perpendicularly relative to each other and making use of the ball tracks, being inserted into the ball cage and then turned into a coaxial position. This step is followed by the balls being inserted radially. The outer joint part is then slid on in a purely coaxial movement, with the joint base being positioned thereagainst also in a purely coaxial movement. The joint base and outer joint part may then be welded together for example or they may be connected to each other by a securing ring. Alternatively, they may be secured to each other by a rolled-on plate metal cap or the like. Because of the predominantly linear movements, the assembly process is suitable for being automated by using tools which are easily controlled.

Any tensile loads on the ball hub and outer joint part are accommodated through contact between the ball hub and the cage on the one hand, pressure applied by the cage window to the balls and contact between the balls and the tracks and thus pressure on the outer joint part on the other hand. In the case of a shear load between the ball hub and joint base, the balls are in contact with the tracks and are supported on the cage windows, the cage resting against the inner guiding faces of the joint base. In this case, too, the non-contacting partial regions of the outer joint part do not have to be machined.

According to a further embodiment, the outer joint part is internally expanded to form a cone in the direction of the joint base which is provided with an externally conical projection containing the undercut-free guiding faces formed therein. Radially outside the conical faces there are provided radial faces at the outer joint part and joint base.

At the joint base and outer joint part there may be provided complementary cylindrical centering faces radially outside the conical and radial faces on which the parts mutually center one another.

In one embodiment, upon contact between the balls and the ball tracks of the outer joint part and ball hub, the ball cage is axially inserted into the outer joint part and when the joint base is axially inserted until it contacts the ball cage, there should be an axial clearance between the outer joint part and the joint base. In this way, by taking into account any play in the cage windows, it is possible to set the smallest possible play between the cage and the guiding faces.

In a related embodiment, both the guiding face in the outer joint part, i.e. especially in the joint base, and the guiding face at the ball hub may be designed to be internally and, respectively, externally spherical while comprising the same radius of curvature as the corresponding contact face of the cage. However, this would be disadvantageous from the point of view of frictional forces. Therefore, in a more advantageous embodiment, the guiding faces in the outer joint part, i.e. in the joint base and at the ball hub, are rotational faces whose radius of curvature is greater than that of the contact face of the outer surface of the cage and smaller than that of the contact face of the inner face of tee cage. The inner guiding face in the joint base, especially towards the inner cone, may be designed with a radius of curvature that is infinite. With this further design it is possible to prevent the cage edges from being subjected to impermissible loads.

A particularly advantageous track shape is achieved if the center lines consist of circular sections an tangentially adjoining straight lines.

The radii of curvature of the spherical guiding faces may be slightly offset on the outside and inside of the cage, although this is not essential for the ball control effected by the tracks. As a result, there are obtained radially longer guiding faces for the balls within the cage window in order to ensure improved guiding conditions at large joint articulation angles.

With a decreasing control angle caused by an increasing articulation angle, there could be a loss of contact between the balls and the tracks. In order to prevent that the track cross sections in one embodiment are such that they ensure a so-called three-point contact, i.e. contact in the base region on the one hand and, depending on the direction of rotation, contact with one of the flanks on the other hand. An embodiment has a planar base for the cross section and two curved flanks, the radius of curvature being greater than that of the balls. The cross section of the tracks in the outer joint part always has to be the same as that of the tracks in the ball hub. A high degree of production accuracy is essential only in respect of the track base. Tolerances in the track flanks do not have a disadvantageous effect.

To ensure a lubricating effect during a relative movement between the cage and the outer joint part and ball hub respectively, the ball hub should be provided with inner free space recesses which increase axially inwardly in the direction of the joint base and which adjoin the inner guiding faces of the cage. The outer joint part, with gaps which adjoin the outer guiding faces of the cage and which are axially open towards the joint aperture, should be exposed relative to the radially inner cage.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
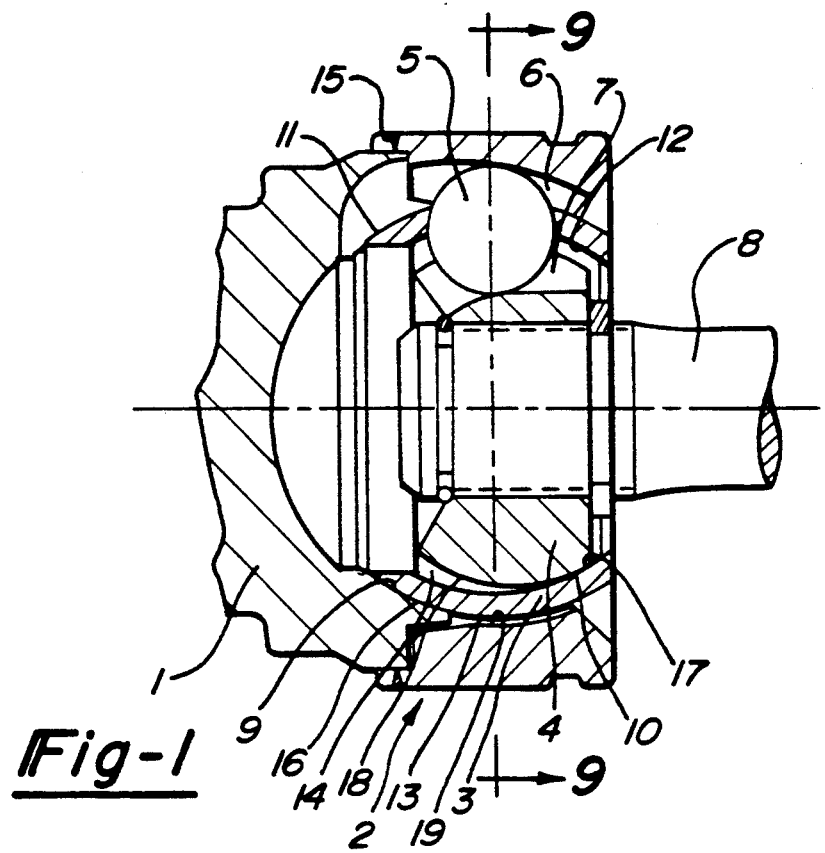
FIG. 1 is a longitudinal section through a constant velocity universal joint in accordance with the invention taken through the line 1—1 of FIG. 9.

Turning to FIGS. 1 through 4, the constant velocity universal joint consists of a joint base 1 which constitutes the output end and which is firmly connected to the outer joint part 2, for example by a weld 15. The inside of the outer joint part 2 comprises a substantially spherical inner face 9, 19 which is provided with a plurality of circumferentially distributed meridional outer tracks 6 running out in the joint base 1.

The outer joint part 2 contains a ball hub 4 which constitutes the input end, which is arranged so as to be articulatable and which has a substantially spherical outer face 10, 18. The ball hub 4 has a plurality of inner tracks 7 for the balls 5, the inner tracks 7 corresponding to the outer tracks 6. The balls 5 are held in mutually corresponding outer and inner tracks 6, 7 so as to be movable in the longitudinal direction. To keep the balls in one plane, even under conditions of articulation, there is provided a cage 3 which comprises a spherical outer face 11 corresponding to the inner face of the outer joint part 2, and an inner face 12 corresponding to the outer face of the ball hub 4. A shaft journal 8 is inserted into the ball hub 4 so as to be firmly connected thereto. On the inside of the joint, the cage 3, on its radial outside, via an outer spherical face 16, rests against inner, approximately spherical guiding faces 9 of the calotte-shaped joint base 1. The guiding faces 9 extend along an axial distance of approximately ⅓ to less than ½ of the total axial extension of the cage 3, whereas the remaining partial region 19 of the outer joint part extending in the direction of the outside of the joint is radially set back and exposed with gaps 13 relative to the outer face 11 of the cage. In this contact-free partial region, the inner face 19 of the outer joint part 2 does not have to be machined.

Figure 2:
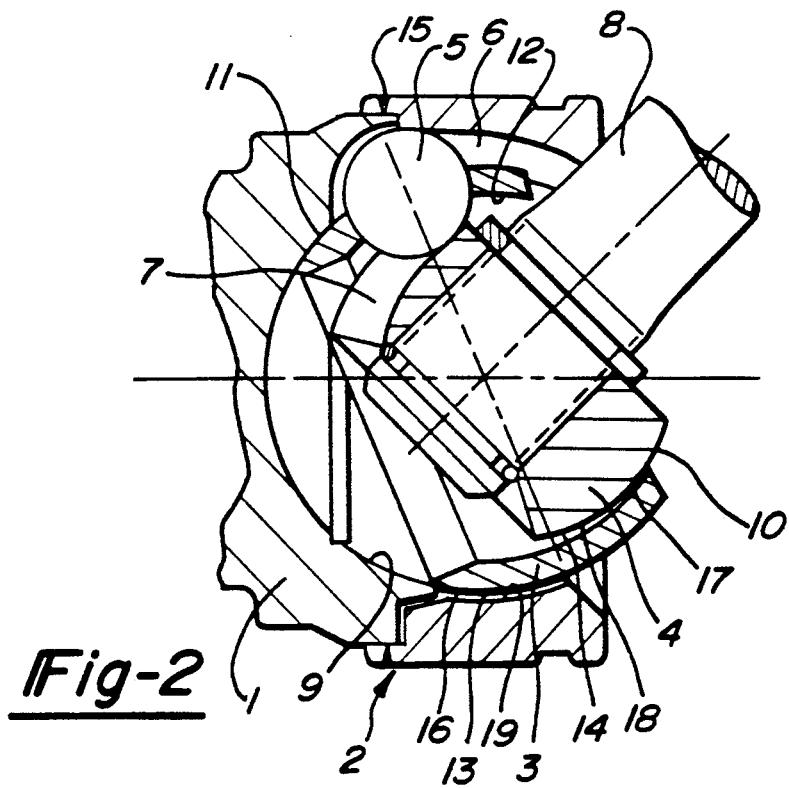
FIG. 2 illustrates a constant velocity universal joint according to FIG. 1, being articulated between the input end and output end.

Towards the outside of the joint, the ball hub 4, on its radial outside, via external, approximately spherical guiding faces 10, rests against a radially inner spherical face 17 of the inner face of the cage 3. The outer guiding faces 10 of the ball hub 4 again extend along an axial distance of approximately ⅓ to ½ of the total axial length of the cage 3, whereas the remaining partial regions 18 adjoining in the direction of the joint interior, i.e. the joint base 1, are radially set back and exposed with free space recesses 14 relative to the inner face 12 of the cage. In the region of the free space recesses 14, the ball hub 4 does not need to be machined. The free space recesses 14 expand in the direction of the joint base 1 in order to ensure the formation of a lubricating wedge during articulation as illustrated in FIG. 2. In the furthest most articulated position, the guiding faces 9, 10, across the entire circumference, still engage the spherical faces 16, 17 of the cage.

Figure 3:
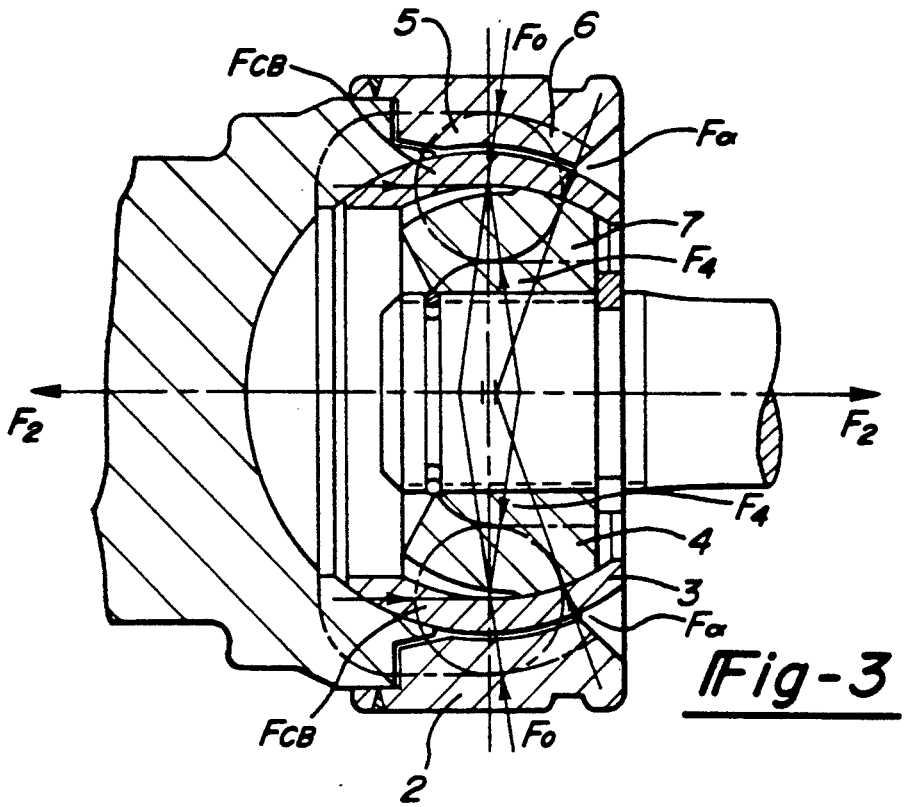
FIG. 3 illustrates the supporting forces of the constant velocity universal joint according to FIG. 1 when pulled apart.

As illustrated in FIG. 3, when a constant velocity joint of the present invention is subject to tensile forces $F_z$ acting on the outer joint part 2 on the one hand and on the ball hub 4 on the other hand, the cage 3 and ball hub 4 are prevented from being pulled apart by the forces $F_{C1}$ which are axially balanced by the forces $F_{CB}$ via which the cage 3 presses on to the balls 5 which, in the respective track base 6, 7, are supported by the forces $F_0$ and $F_1$. The forces $F_0$ and $F_1$ are balanced by the forces $F_{CB}$ at the balls.

Figure 4:
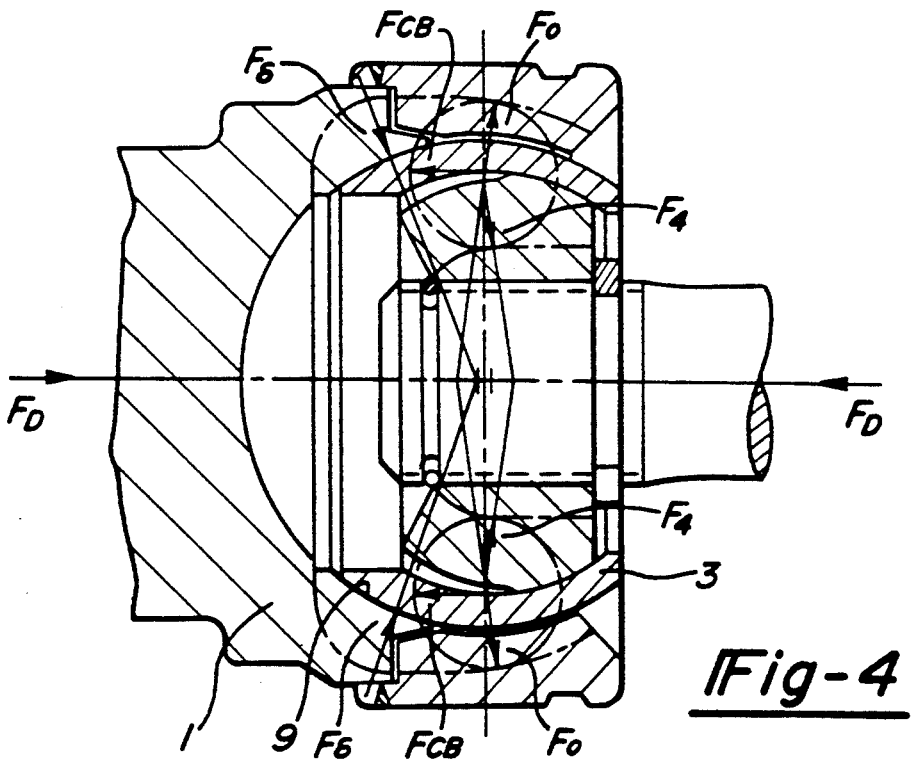
FIG. 4 illustrates the supporting forces of the constant velocity universal joint according to FIG. 1 when pushed together.

Turning to FIG. 4, if the ball hub 4 and outer joint part 2 are pushed together by the forces $F_D$, axial displacement in the region of the outer contact faces 9 at the joint base 1 is prevented by the supporting forces $F_S$. The forces $F_{CB}$ of the balls act directly on the cage 3 and are axially balanced by the supporting forces $F_S$. At the balls, the ball forces $F_1$ and $F_0$, in turn, are balanced by the forces $F_{CB}$.

Figure 5:
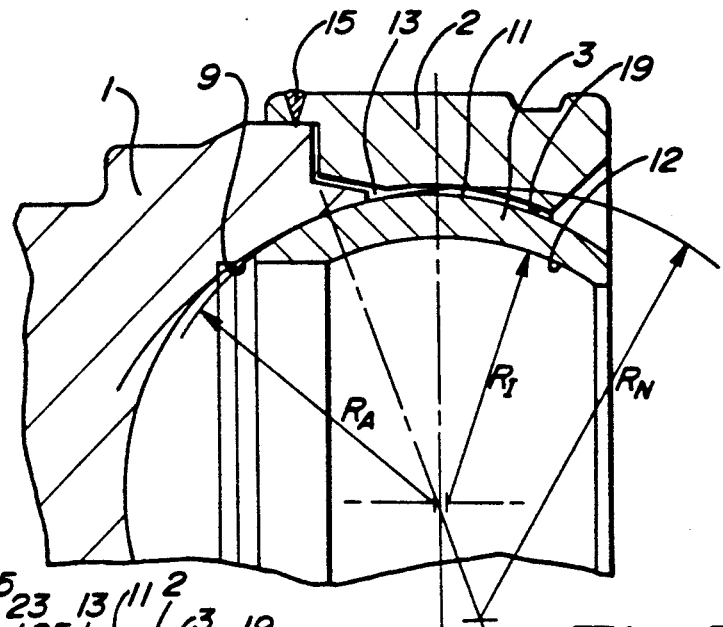
FIG. 5 illustrates half a section through a constant velocity universal joint of the present invention.
Figure 7:
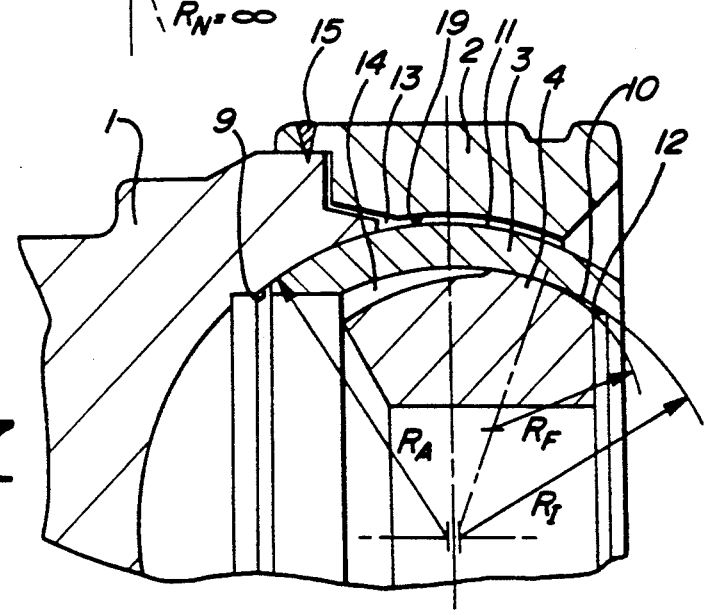
FIG. 7 illustrates half a section through an embodiment of the present invention.

Turning to FIGS. 5 and 7, details corresponding to one another have been given the same reference numbers as in FIGS. 1 to 4, with only the joint base 1, the outer joint part 2, the ball cage 3 and ball hub 4 (FIG. 7) being referred to. The figures show sections between the ball tracks, which clearly illustrate the guiding faces.

In FIG. 5, the guiding face 9 in the joint base 1 has a radius $R_N$ which is greater than the radius $R_A$ of the outer face 11 of the cage 3 in the contact region with the guiding face mentioned first. It can also be seen that the center of the radius $R_A$ of the outer face 11 and the center of the radius $R_I$ of the inner face 12 of the cage 3 are axially offset relative to each other.

Figure 6:
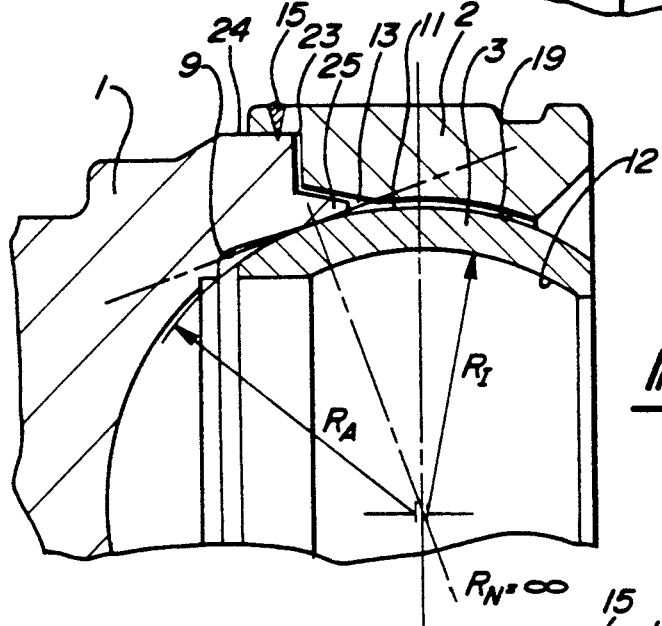
FIG. 6 illustrates half a section through a constant velocity universal joint of the present invention.

In FIG. 6, the radius $R_N$ of the guiding face 9 is infinite, i.e. the guiding face 9 in the joint base 1 forms an inner cone. An externally conical projection 25 nests within the outer joint part which is internally conically expanded to receive the conical region 25. Centering may be aided via a cylindrical face 23 on the outer joint part 2 which is complementary to a cylindrical face 24 in the joint base 1.

In FIG. 7, the radius of the inner guiding face 9 in the joint base 1 corresponds to the radius $R_A$ of the outer face 11 of the cage 3 in the region of contact. In contrast to FIGS. 5 and 6, FIG. 7 also shows the ball hub 4 having a guiding face 10 with an externally spherical shape whose radius of curvature $R_F$ is smaller than the previously mentioned radius $R_I$ of the inner face 12 of the cage 3. In this figure too, the centers of the radii $R_A$ and $R_I$ are axially offset relative to each other.

The longitudinal section of the guiding face 9, apart from the shapes illustrated, may also assume other curves such as the curvature of an ellipse. The same applies to the shape of the guiding face 10 according to FIG. 7 whose longitudinal section may also assume the shape of an ellipse or other curve shapes.

Figure 8:
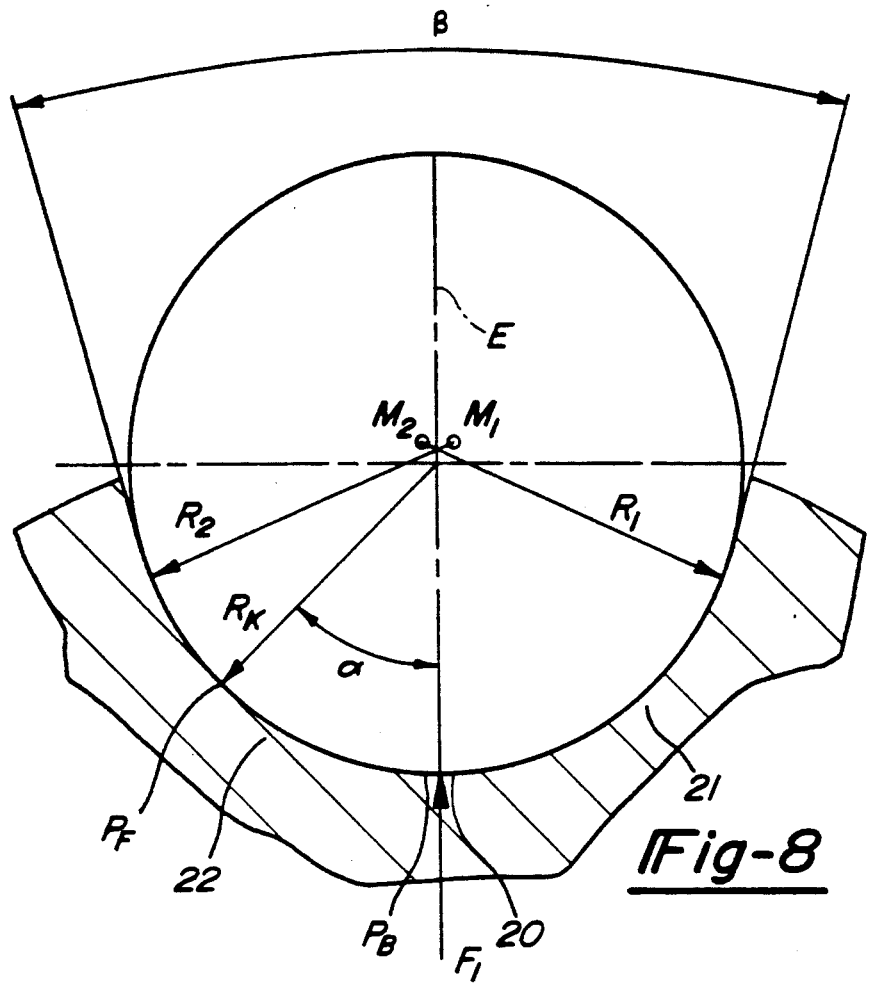
FIG. 8 is half a section through a ball track.
Figure 9:
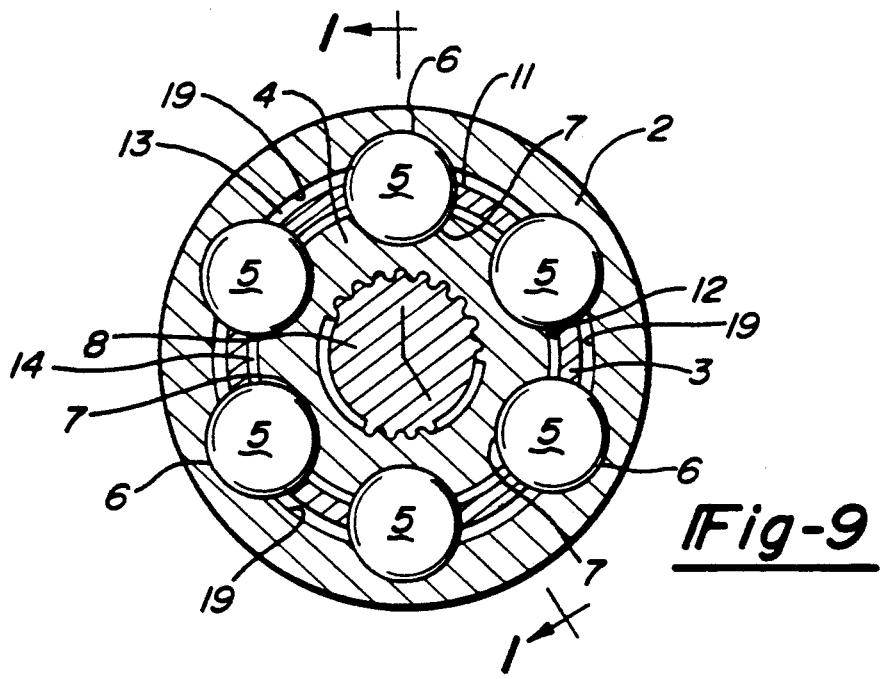
FIG. 9 is a cross sectional view taken through the line 9—9 of FIG. 1.

FIG. 8 is a cross section through a track in the inner joint part. A planar base 20 on which the ball is supported via the force $F_1$ (with the same track shape in principle, this would be the force $F_0$ in the outer joint part) is provided. Viewed in cross section, the flanks 21, 22 are formed by two circular arches around the centers $M_1$ and $M_2$, the radii of curvature $R_1$ and $R_2$ being identical in size, but greater than the ball radius $R_K$. Apart from being supported on the contact point $P_B$ at the base 20 (assuming torque conditions), the ball is supported at the contact point $P_F$ at the track flank 22 which extends at an angle $\alpha$ relative to the central track plane E. From an angle which is greater than the angle $\alpha$, the flanks 21, 22 continue tangentially. The angle $\beta$ enclosed by the flanks, as a consequence is greater than $2\alpha$.

While the above detailed description describes the preferred embodiment of the present invention, the invention is susceptible to modification, variation, and alteration without deviating from the scope and fair meaning of the subjoined claims.

I claim:

1. A constant velocity universal joint design as a fixed joint comprising:
    an outer joint part having an open end and an inner face;
    a plurality of first undercut-free meridional ball tracks disposed within said outer joint part;
    a ball hub having an outer face;
    a second plurality of undercut-free meridional ball tracks disposed within said ball hub;
    a ball received in each of said first ball tracks and said second ball tracks for transmitting torque between said ball hub and said outer joint part, said first ball tracks and second ball tracks having corresponding open ends;
    ball cage means for holding said balls in a common plane, said ball cage means having an inner and outer part-spherical face and defining a central through aperture in which the ball hub is received;
    a joint base affixed to said outer joint part at the open end of said first tracks, said joint base having an internally positioned first undercut-free guiding face forming a contact region relative to a partial region of the outer part spherical face of the cage means;
    a first free space recess defined by the inner face of the outer joint part and the outer face of said cage means, said first recess free space positioned adjacent to said contact region of said joint base and extending the length of said outer joint part;
    and wherein the center lines of the ball second tracks are each undercut-free in the same axial direction axially towards the open end of said outer joint part and away from said joint base, and wherein said first undercut free guiding face is undercut-free in the opposite direction towards said joint base;
    a second undercut-free guiding face externally positioned on said ball hub forming a contact region relative to a partial region of said inner part spherical face of said cage means; and
    a second free space recess defined by the outer face of said ball hub and the inner part spherical face of said cage means, said second recess positioned adjacent the contact region, of said ball hub and reaching from the end face of the ball hub adjacent said joint base axially beyond the common plane of said balls.

2. A constant velocity joint of claim 1 wherein said outer joint part is internally conically enlarged in the direction towards said joint base and said joint base is provided with an externally conical projection containing said first undercut-free guiding face formed therein.

3. A constant velocity universal joint of claim 2 wherein said outer joint part further comprises a cylindrical centering face and said joint base further comprises a complementary cylindrical centering face to ensure mutual centering of said outer joint part to said joint base.

4. A constant velocity universal joint of claim 2 wherein upon contact between said balls and said first and second track of said outer joint part and said ball hub and upon contact between the guiding face of the joint base and the ball cage means, there exists an axial distance between the internal conical face of the outer joint part and the conical projection of the joint base.

5. A constant velocity universal joint of claim 1 wherein said first guiding face has a radius of curvature when viewed in a longitudinal section, greater than the radius of curvature of said contact region of the outer face of said cage means when viewed in a longitudinal section.

6. A constant velocity universal joint of claim 5 wherein said first guiding face comprises an internal cone.

7. A constant velocity universal joint of claim 5 wherein said first free space recess adjoining said first guiding face is widening axially relative to the open end of said joint.

8. A constant velocity universal joint of claim 1 wherein said second undercut-free guiding face of said ball hub has a radius of curvature, when viewed in a longitudinal section, smaller than or equal to the radius of curvature of said contact region of said inner face of said cage means.

9. A constant velocity universal joint of claim 8 wherein said second free space recess adjoining said second guiding face increases towards the direction of the joint base.

10. A constant velocity universal joint of claim 9 wherein said second free space recess is dimensioned such that the depth of said second ball tracks are substantially constant.

11. A constant velocity universal joint of claim 9 wherein the surface of said ball hub defining said second free space recess is produced in a non-chip-forming manner.

12. A constant velocity universal joint of claim 1 wherein said outer joint part is produced in a non-chip-forming manner in the regions of said first free space recess.

13. A constant velocity universal joint of claim 1 wherein said first and second ball tracks have a cross section allowing individual contact points with said ball means, two of which are always effective in each of said ball tracks when said constant velocity universal joint is transmitting torque between sad outer joint part and said ball hub.

14. A constant velocity universal joint of claim 13 wherein:
said ball has a radius; and
said first and second ball tracks further comprise:
a tangentially positioned base face; and
a curved flank on either side of said base face, each of said flanks having a radius of curvature which is greater than said radius.

15. A constant velocity universal joint of claim 1 wherein:
said outer part spherical face of said ball cage means is a spherical face having a first center; and
said inner part spherical face of said ball cage means is a spherical face having a second center wherein said first and second centers are axially offset by approximately the same amounts in opposite directions from the joint center.

* * * * *